3,406,158
**PROCESS FOR THE PRODUCTION OF
SULFURIZED PHENOLS**
Joseph Patrick Brown and Ernest Bryson McCall, Llangollen, Denbighshire, Wales, assignors to Monsanto Chemicals Limited, London, England, a British company
No Drawing. Filed Sept. 29, 1965, Ser. No. 491,420
Claims priority, application Great Britain, Oct. 2, 1964, 40,205/64
11 Claims. (Cl. 260—137)

ABSTRACT OF THE DISCLOSURE

A phenol is heated with 0.5 to 5.0 atomic proportions of sulfur per molar proportion of the phenol at 150°–300° C. in the presence of a Friedel-Crafts catalyst to form a sulfurized phenol useful for the preservation of rubber.

---

This invention relates to phenolic materials, more particularly to new sulfurized phenols.

The new materials of the invention are sulfurized phenols formed by the reaction of sulphur with a phenol in the presence of a Friedel-Crafts catalyst.

The sulfurized phenols are useful for example as antioxidants in rubber and other organic materials, for instance polyolefins, that are liable to oxidative deterioration. They may also be employed as raw materials in the production of various resins, for example epoxy resins, where a phenolic component is required.

The present invention accordingly also includes a rubber composition containing a sulfurized phenol of the invention as an antioxidant.

The molecular structure of the sulfurized phenols is not known with certainty, but the available evidence suggests that they contain a small number, perhaps from 2 to 5, of phenol nuclei bridged by mono- or di-sulfide linkages. Bridging at positions ortho to the phenolic hydroxy groups is believed to predominate. The new sulfurized phenols are alkali soluble.

Preferred materials are those where the phenol is phenol itself, and those that are formed by the reaction of equimolar or substantially equimolar quantities of the phenol and sulfur. For example one atomic proportion of sulfur can be reacted with from 0.9 to 1.1 molar proportions of the phenols.

Aluminum chloride and aluminum bromide are particularly effective as catalysts in the production of the sulfurized phenols.

While the preferred materials are those derived from phenol itself, new sulfurized phenols of the invention can be obtained from a range of phenolic materials. Such materials can contain one or more phenolic hydroxyl groups, and they include for example dihydroxybenzenes, for instance resorcinol, naphthols and dihydroxybiphenyls. Sulfurized phenols can also be obtained from phenolic starting materials where the nucleus to which a phenolic hydroxyl group is attached also contains an inert substituent, for example an aryl, aryloxy, or aralkyl group. More than one such substituent can be present. Typical aryl and aryloxy groups are respectively phenyl and phenoxy; an aralkyl substituent can be for example a benzyl, α-methylbenzyl or α,α-dimethylbenzyl group, so that the phenolic starting material can be for instance a phenylphenol or a bis(α-methylbenzyl)phenol.

Although sulfurized phenols derived from the reaction of one molar proportion of the phenol with substantially one atomic proportion of sulfur are preferred, more generally a range of proportions of the reactants can be used. The proportions can, for example, vary from 0.5 to 5 atomic proportions (for instance 0.8, 1.25, 1.5, or 2 atomic proportions) of sulfur to one molar proportion of the phenol.

Friedel-Crafts catalysts that can be used include, in addition to the preferred aluminum halides referred to above, ferric chloride, zinc chloride, and stannous bromide.

A suitable amount of the Friedel-Crafts catalyst is from 0.005 to 0.1 mol., for example 0.02 mol., of the catalyst per mol. of phenolic starting material.

An elevated reaction temperature is usually required for the formation of the sulfurized phenols. Temperatures of 150° C. or above, for example temperatures in the range of 150° to 300° C., are generally suitable. A preferred temperature range is from 150° to 230° C. Where the phenol is one having a normal boiling point within such a temperature range, as is the case with phenol itself for example, the process is conveniently conducted by boiling the reaction mixture under reflux.

The course of the reaction can be followed by observing the evolution of hydrogen sulfide, and the reaction is terminated when this has ceased or when the rate has fallen to a very low figure.

The process for the production of a sulfurized phenol preferably includes a stage at which the catalyst is removed from the initial reaction product. This can be effected by conventional means, for example by washing a solution of the initial product in a water-immiscible organic solvent with water or an aqueous acid. The sulfurized phenols can be used as antioxidants for both natural and synthetic rubber. Synthetic rubbers which can be protected include polymers of 1,3-butadienes, for instance 1,3-butadiene itself and isoprene, copolymers of 1,3-butadienes with other monomers, such as styrene, acrylonitrile, isobutylene, or methyl methacrylate, and polyolefin rubbers, for instance ethylene-propylene copolymers. The rubbers may be vulcanized or unvulcanized. The sulfurized phenols are particularly useful as antioxidants in white or light-colored rubber stocks since they show little tendency to discloloration.

The sulfurized phenol can be incorporated into the rubber by conventional means, using for example a roll mill or an internal mixer. Where the process is used to produce a vulcanized rubber having improved resistance to deterioration, the antioxidant is normally incorporated into the rubber prior to vulcanization together with other commonly used ingredients, such as for instance zinc oxide, stearic acid, a filler, a vulcanizing agent and a vulcanization accelerator. The vulcanization proper, in which the mixture so obtained is heated, is carried out at a temperature appropriate to the particular rubber concerned, for example at a temperature of about 135°–155° C. where the composition is based on natural rubber, or at a temperature of about 140°–160° C. where the composition is based on a styrene-butadiene rubber.

Where a sulfurized phenol is used to protect an unvulcanized rubber, incorporation can be by milling into the solid rubber, but very often, and particularly where the rubber is synthetic, the antioxidant is more conveniently added to a latex or solution of the rubber, for example one obtained during its manufacture. An additive used in this way is generally referred to as a stabilizer for the synthetic rubber.

The amount of the sulfurized phenol incorporated in the rubber can vary between wide limits, for instance from 0.1 to 5 parts by weight per 100 parts by weight of rubber, but in general it has been found preferable to use from 0.2 to 3 parts by weight, and particularly from 0.5 to 2 parts by weight, per hundred parts by weight of rubber.

Polyolefins that can be stabilized by the sulfurized phenols of the invention include polyethylene and polypropylene.

The invention is illustrated by the following examples.

Example 1

This example describes the production of a sulfurized phenol by the reaction of phenol and sulfur in the presence of aluminum bromide.

A mixture of 94 grams (1 mole) of phenol, 32 grams (1.0 gram atom) of sulfur and 5 grams (0.019 mole) of anhydrous aluminum bromide was boiled under reflux. The temperature of the reaction mixture, initially 185° C., rose gradually to 217° C. during 48 hours. At the end of this period the evolution of hydrogen sulfide had virtually ceased and the reaction was terminated.

After cooling, the reaction mass was dissolved in 250 cc. of ether. The ether solution was washed with aqueous hydrochloric acid obtained by diluting 50 cc. of concentrated hydrochloric acid (S.G. 1.16) with 100 cc. of water, then with water until the washings were substantially neutral, and was finally separated and dried. The ether was removed by distillation at atmospheric pressure and other distillable materials (including some unreacted phenol) were removed by heating to a temperature of 170° C. at a pressure of 2 mm. of mercury.

The residue, which weighed 60 grams, was a brittle brown-grey resin, which was completely soluble in N aqueous sodium hydroxide solution.

Example 2

The process described in Example 1 was repeated using as catalyst 5 grams of aluminum chloride instead of aluminum bromide.

Distillable materials were removed from the product by heating to a pot temperature of 200° C. at a pressure of 1 mm. of mercury. The residue of sulfurized phenol so obtained was a light brown gum weighing 72 grams. It was completely soluble in dilute aqueous alkali.

Example 3

This example illustrates the use of the sulfurized phenols of the previous examples in a white rubber stock, and describes the method used to assess their effectiveness as antioxidants.

A masterbatch of the following composition was compounded on a laboratory mill:

| | Parts by weight |
|---|---|
| Pale crepe | 100 |
| Blanc fixe | 50 |
| Titanium dioxide | 5 |
| Zinc oxide | 5 |
| Stearic acid | 1 |
| Sulfur | 2.5 |
| Diphenylguanidine | 1 |

A porton of the masterbatch was taken and into it was incorporated a sample of the sulfurized phenol of Example 1 at a level equivalent to one part by weight of the sulfurized phenol per 100 parts by weight of rubber. The sulfurized phenol of Example 2 and, for comparison, a commercial phenolic antioxidant (styrenated phenol) were respectively incorporated at the same level into further portions of the masterbatch.

Portions of each stock were moulded into the shape of a rubber band and vulcanized by heating at 153° C. for thirty minutes. The resulting test pieces were roughly rectangular with rounded ends and internal dimensions of 3″ x ⅝″; they were 4 mm. wide and 1 mm. thick.

The effect of the antioxidant in the samples was determined by the measurement of the stress relaxation half-life in air at 110° C. according to the method described by Robinson and Vodden in "Industrial and Engineering Chemistry," 1955, vol. 47, p. 1477. The half-life is the time taken for the stress in the sample, stretched to 75% extension, to diminish to half its value, and gives a direct measure of the effectiveness of the antioxidant.

The results obtained, which are given below, shown that the sulfurized phenols were more effective antioxidants than the commercial styrenated phenol:

| Antioxidants: | Half-life in hours |
|---|---|
| Sulfurized phenol of Example 1 | 2.0 |
| Sulfurized phenol of Example 2 | 2.1 |
| Styrenated phenol | 1.75 |

Example 4

This example describes the production of a sulfurized phenol using zinc chloride as a catalyst.

A mixture of 94 grams (1 mole) of phenol, 32 grams (1.0 gram atom) of sulfur and 5 grams (0.037 mole) of zinc chloride was boiled under reflux. The temperature of the reaction mixture, initially 180° C., rose gradually to 215° C. during 22 hours. At the end of this period the evolution of hydrogen sulfide had virtually ceased and the reaction was terminated.

After cooling, the reaction mass was dissolved in 250 cc. of benzene and the benzene solution was washed successively with dilute aqueous hydrochloric acid and with water. The benzene was removed by distillation at atmospheric pressure, and other distillable materials (including 20.3 grams of unreacted phenol) were removed by heating to a temperature of 170° C. at a pressure of 11 mm. of mercury. The residue, which weighed 75.3 grams, was a brittle dark brown resin.

Example 5

This example describes the production of a sulfurized phenol from sulfur and an aralkyl-substituted phenol.

A mixture of 16 grams (0.5 gram atom) of sulfur, 2.5 grams (0.019 mole) of anhydrous aluminum chloride, and 156 grams (0.5 mole) of a mixture of bis($\alpha$-methylbenzyl)phenols in which the major component was 2,4-bis($\alpha$-methylbenzyl)phenol was heated at 200°–210° C. for 24 hours.

After cooling, the reaction mass was dissolved in 250 cc. of benzene, and the benzene solution was washed with dilute hydrochloric acid and with successive portions of water until the washings were substantially neutral. The benzene was then removed by distillation at atmospheric pressure and remaining volatile materials by holding the residue at 180° C. at a pressure of 2 mm. of mercury for 1 hour. The product was a dark resin.

Example 6

This example describes the production of samples of vulcanized rubber containing sulfurized phenols according to the invention as antioxidants.

The effectiveness of the antioxidant was assessed by the following test method, which is based on the fact that an antioxidant retards the rate at which the stress required to produce a given extension in a sample of rubber decreases while the rubber is "aged," that is, subjected to attack by atmospheric oxygen at an elevated temperature. Measurements were made on a sample which was unstressed during aging and on a sample which was stressed, the rate of decrease being dependent on the tension in the rubber irrespective of the presence or absence of an antioxidant.

A masterbatch of the following composition was compounded on a laboratory mill:

| | Parts by weight |
|---|---|
| Pale crepe | 100 |
| Zinc oxide | 5 |
| Stearic acid | 1 |
| Blanc fixe | 50 |
| Titanium dioxide | 5 |
| Sulfur | 2.5 |
| Diphenylguanidine | 1 |

A portion of the masterbatch was taken, and the antioxidant was milled into it in an amount equivalent to 1.5 parts by weight per 100 parts by weight of rubber in the masterbatch.

A number of rectangular bands, each having side walls 79 mm. in length and 4 mm. x 1 mm. in cross section, and thickened end walls 11 mm. in length, were moulded from the rubber stock by vulcanizing at 153° C. for 30 minutes.

The stress required to extend the bands in their original or "unaged" condition to 1½ times their unstretched length was determined using a Baldwin machine by taking one band, stretching it to 50% extension, releasing, and again stretching to 50% extension, the stress required for the second extension being the figure recorded.

Two other bands were placed in an air oven at 90° C., one of the bands being supported so that except for its own weight it was unstressed, while the other was extended over hooks so spaced that the length of the band was 44±0.5% more than its unstretched length.

After 64 hours, the bands were removed from the oven, and after cooling, the stress required to extend each to 1½ times its original length was measured using the same procedure as for the original unaged band.

Corresponding measurements were made on two control sets of bands moulded from further portions of the masterbatch, one of which sets contained no antioxidant and the second a commercially available non-discoloring antioxidant, "styrenated phenol."

The results given in the table below show that the sulfurized phenols are very effective antioxidants. The figures in parentheses are the values obtained in repeat determinations using a second masterbatch. A third masterbatch was employed in evaluating the product of Example 5.

| Antioxidant | Percent original stress retained after 64 hours at 90° C. | |
|---|---|---|
| | Unstressed during aging | Stressed during aging |
| Product of Example 2 | 95.6 (89.2) | 38.2 (37.6) |
| Product of Example 4 | 91.4 (97.7) | 23.7 (32.0) |
| Styrenated phenol | 77.5 (83.3) | 10.8 (23.3) |
| None | 62.9 (69.6) | 0 (3.20) |
| Product of Example 5 | 99.1 | 38.5 |
| Styrenated phenol | 91.6 | 24.2 |
| None | 80.5 | 3.4 |

It is intended to cover all modifications of examples chosen for purposes of disclosure which do not constitute departure from the spirit and scope of the invention.

What is claimed is:

1. A sulfurized phenol formed by heating sulfur with a phenol selected from the group consisting of phenol, dihydroxy benzene, napthol, dihydroxy biphenyl, nuclear substituted phenol, nuclear substituted dihydroxy benzene, nuclear substituted naphthol and nuclear substituted dihydroxy biphenyl wherein the substitutents are selected from the group consisting of phenyl, phenoxy, benzyl alpha-methylbenzyl, and alpha, alpha-dimethylbenzyl at a temperature of from 150°–300° C. in the proportions of 0.5 to 5.0 atomic proportions of sulfur per molar proportion of said phenol in the presence of a Friedel-Crafts catalyst.

2. A process for the production of a sulfurized phenol in which sulfur is heated with a phenol selected from the group consisting of phenol, dihydroxy benzene, naphthol, dihydroxy biphenyl, nuclear substituted phenol, nuclear substituted dihydroxy benzene, nuclear substituted naphthol and nuclear substituted dihydroxy biphenyl wherein the substituents are selected from the group consisting of phenyl, phenoxy, benzyl, alpha-methyl-benzyl and alpha, alpha-dimethylbenzyl at a temperature of from 150°–300° C. in the proportions of 0.5 to 5.0 atomic proportions of sulfur per molar proportion of said phenol in the presence of a Friedel-Crafts catalyst.

3. A process according to claim 2 in which one atomic proportion of sulfur is heated with from 0.9 to 1.1 molar proportions of the phenol.

4. A process according to claim 2 in which the catalyst is aluminum chloride, aluminum bromide, or zinc chloride.

5. A process according to claim 2 in which the sulfur and the phenol are heated at a temperature in the range 150° to 230° C.

6. A process according to claim 2 and in which the catalyst residues are removed from the initial product.

7. A process according to claim 2 in which the phenol is phenol itself.

8. A process according to claim 2 in which the phenol is an aralkyl-substituted phenol.

9. A process according to claim 8 in which the phenol is a bis(a-methylbenzyl) phenol.

10. A sulfurized phenol formed by heating 0.9 to 1.1 molar proportions of phenol and one atomic weight proportion of sulfur at 150°–230° C. in the presence of a Friedel-Crafts catalyst.

11. A sulfurized phenol formed by heating 0.9 to 1.1 molar proportions of 2,4-bis,alpha-methylbenzyl) phenol and one atomic weight proportion of sulfur at 150°–230° C. in the presence of a Friedel-Crafts catalyst.

References Cited

UNITED STATES PATENTS 2,461,901  2/1949  Kartaschoff _____ 260—137 XR

CHARLES B. PARKER, *Primary Examiner.*

D. R. PHILLIPS, *Assistant Examiner.*